(12) United States Patent
Jenkins (10) Patent No.: US 7,012,633 B2
(45) Date of Patent: Mar. 14, 2006

(54) COLOR CALIBRATION METHOD FOR IMAGING COLOR MEASUREMENT DEVICE

(75) Inventor: David R. Jenkins, Chapel Hill, NC (US)

(73) Assignee: Radiant Imaging, Inv., Duvall, WA (US)

( * ) Notice: Subject to any disclaimer, the term of this patent is extended or adjusted under 35 U.S.C. 154(b) by 634 days.

(21) Appl. No.: 10/092,417

(22) Filed: Mar. 6, 2002

(65) Prior Publication Data

US 2003/0169347 A1 Sep. 11, 2003

(51) Int. Cl.
H04N 1/60 (2006.01)
H04N 17/00 (2006.01)
H04N 17/02 (2006.01)

(52) U.S. Cl. ............ 348/180; 348/191; 348/807; 348/222.1; 382/167; 358/518; 358/504

(58) Field of Classification Search ........ 348/189–191, 348/222, 188, 180, 179, 182, 807, 650, 655, 348/272, 273, 222.1, 223.1; 382/162, 167; 358/518, 504, 514, 512

See application file for complete search history.

(56) References Cited

U.S. PATENT DOCUMENTS

| 4,833,533 A | 5/1989 | Augusti et al. |
| 5,051,776 A | 9/1991 | Mancino |
| RE36,047 E | 1/1999 | Gilblom et al. |
| 5,983,161 A | 11/1999 | Lemelson et al. |
| 6,215,893 B1 | 4/2001 | Leshem et al. |
| 6,362,849 B1 * | 3/2002 | Caisey-Bluteau et al. ............ 348/222.1 |

FOREIGN PATENT DOCUMENTS

| JP | 10-132703 | 5/1998 |
| WO | WO 97/27708 | 7/1997 |

* cited by examiner

Primary Examiner—John Miller
Assistant Examiner—Jean W. Désir
(74) Attorney, Agent, or Firm—Stetina Brunda Garred & Brucker (57) ABSTRACT

A color calibration method for an imaging color measurement device utilizes a detector array, a plurality of optical elements, and multiple instances of irradiation of the detector array for a single measurement. A flat-fielding correction error correction matrix of the imaging color measurement device for each instance of irradiation of the detector array is obtained prior to color calibration. The response for each instance of irradiation of the detector array is flat-fielded with the corresponding error matrix to obtain a flat-fielded, spectrally weighted irradiance response for each instance of irradiation of the detector array. An illuminant light source with known spectral output or chromaticity coordinates is measured to obtain an irradiance response of the imaging color measurement device for each instance of irradiation of the detector array. A color correction coefficient is calculated using the known spectral output and chromaticity coordinates of the light source and the corresponding flat-fielded irradiance response.

14 Claims, 5 Drawing Sheets

CCD Tristimulus Colorimeter
Calibration - Flat Fielding $$M \cdot K = L$$

COLOR CALIBRATION METHOD FOR IMAGING COLOR MEASUREMENT DEVICE

CROSS REFERENCE OF RELATED APPLICATION (Not Applicable)

STATEMENT RE: FEDERALLY SPONSORED RESEARCH/DEVELOPMENT (Not Applicable)

BACKGROUND OF THE INVENTION

The present invention relates generally to a color calibration method for imaging color measurement devices. More particularly, the present invention relates to a calibrating means for a color measurement system for the measurement of color, in quantifiable units.

It is often desired to know the color of light emitted by an illumination system, a light source, or a display system in order to characterize its performance. Traditionally, this has been accomplished by a calorimeter or a spectroradiometer, which measures the average color over an angular extent.

Currently, the spectroradiometer is the most accurate instrument for determining the color of light in quantifiable units. The spectroradiometer captures the entire spectrum of a visible light emitted by a light source. The light source includes any surface or volume that emits, transmits or reflects optical radiation. The measured spectral data may be mathematically analyzed to determine the color of the light defined by a standard color space. Commonly used color spaces for illumination systems are CIE (Commission Internationale de l'Eclairage) 1931 (x,y) chromaticity coordinates, CIE 1964 (u',v') chromaticity coordinates, and the L*, a*, b* color space. In principle, an infinite number of color space are possible. However, only a few are routinely used in industrial practice.

Figure 1:
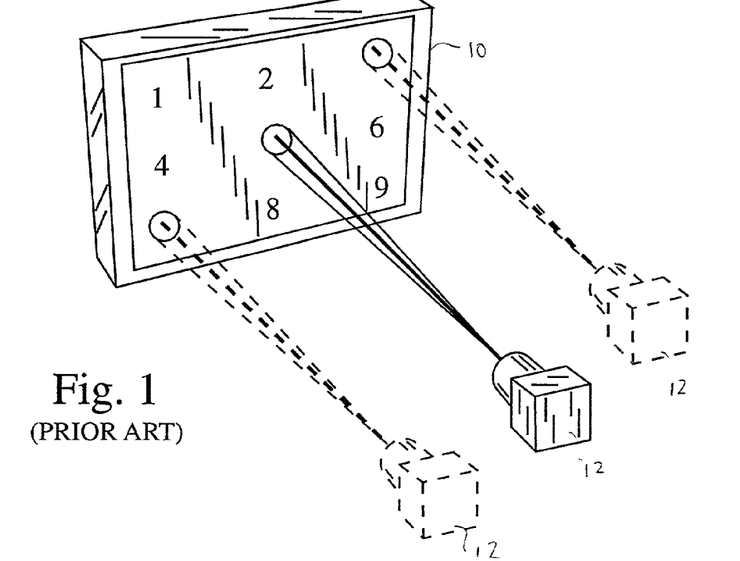
FIG. 1 shows a traditional spot measurement technique of measuring a display device light and color output.
Figure 2:
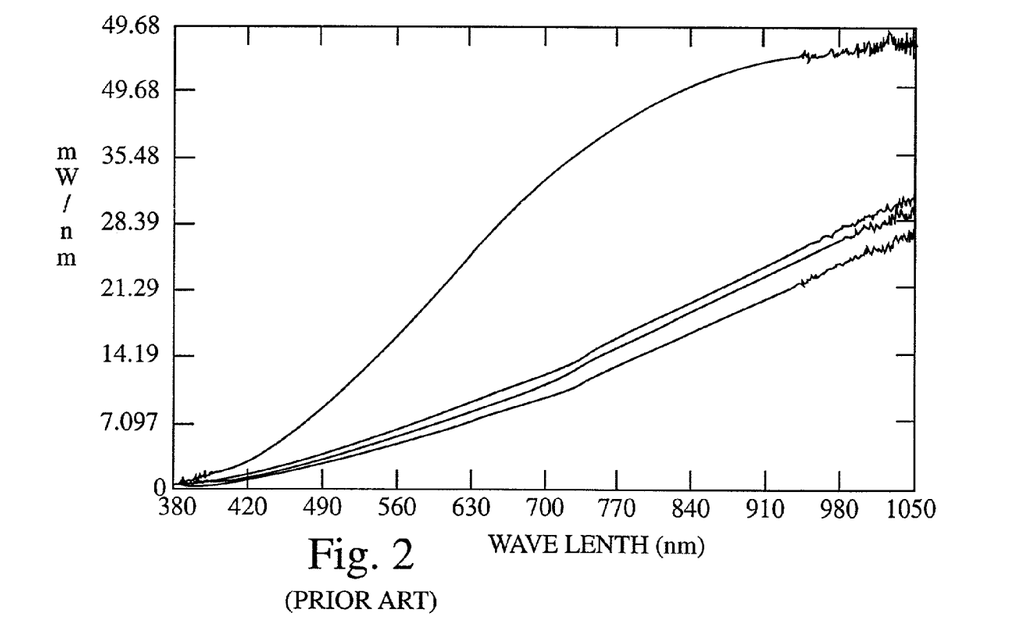
FIG. 2 shows a sample of four spectroradiometer measurement data sets using the spectroradiometer as shown in FIG. 1.

A diagram of the experimental set-up for display measurements made with a spectroradiometer are shown in FIG. 1. The spectroradiometer 12 captures light from some small portion of the display surface 10 (the light is emitted in the direction of the spectroradiometer) and acquires data of the spectral content of the light. A sample of four spectroradiometer measurement data sets is shown in FIG. 2. The vertical axis of the graph is normally recorded in W/nm/sr. The horizontal axis of the graph shows the wavelength of light, commonly in nm. The spectral power distribution of light is commonly written as function $S(\lambda)$. The spectroradiometer is able to calculate the CIE 1931 tristimulus values by employing the following formulas defined by CIE:

$$X = \int_{380 nm}^{780 nm} S(\lambda)x(\lambda)d\lambda, \quad Y = \int_{380 nm}^{780 nm} S(\lambda)y(\lambda)d\lambda,$$

$$Z = \int_{380 nm}^{780 nm} S(\lambda)z(\lambda)d\lambda$$

In the above formulas, $x(\lambda)$, $y(\lambda)$ and $z(\lambda)$ are the CIE 1931 2 degree standard observer color matching functions specifically defined by the CIE to serve as international definitions for the CIE 1931 (x,y) color space. The chromaticity coordinates are then determined by the following formulas:

$$x = \frac{X}{X+Y+Z}, \quad y = \frac{Y}{X+Y+Z}$$

If the spectroradiometer has been calibrated to accurately measure the spectral content of light, there is no further calibration required of a spectroradiometer to accurately measure the CIE 1931 tristimulus values and calculate the 1931 chromaticity coordinates accurately.

Figure 3:
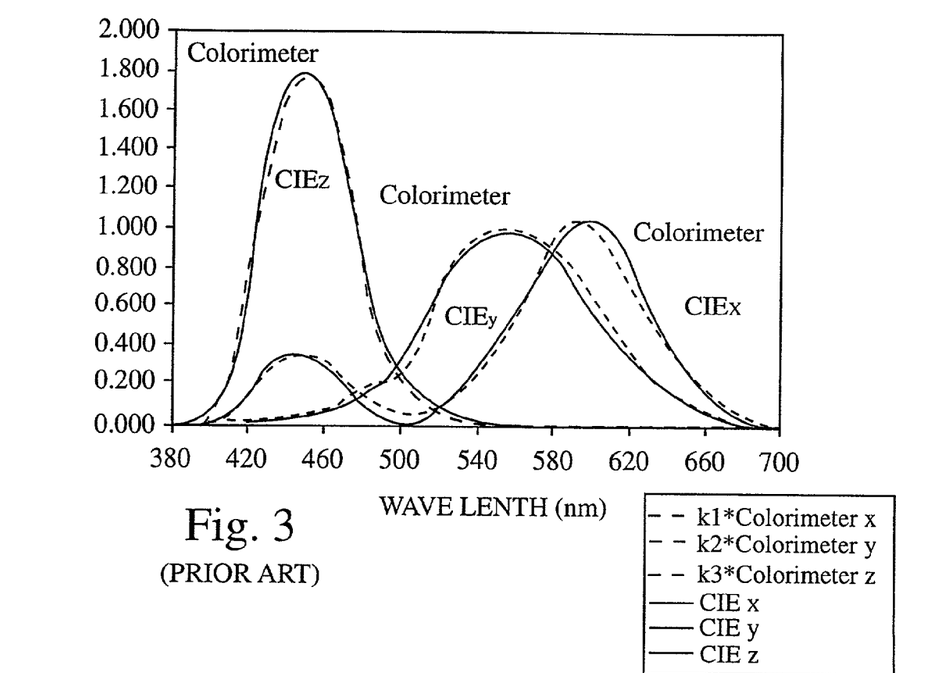
FIG. 3 shows both the spectral response of a calorimeter and the CIE 1931 chromaticity matching functions.

A calorimeter is often used as a color measurement device instead of a spectroradiometer because the cost of a calorimeter is substantially less than a spectroradiometer. Most calorimeters are tristimulus calorimeters, which means that they attempt to measure the X, Y and Z CIE 1931 chromaticity matching functions. A calorimeter normally consists of a lens to focus the light onto a detector (sometimes multiple detectors) and color filters disposed between the lens and the detector(s). The spectral response of the traditional tristimulus calorimeter closely approximates the $x(\lambda)$, $y(\lambda)$, and $z(\lambda)$ tristimulus matching functions shown as FIG. 3. As shown in FIG. 3, the spectral response of a real calorimeter system is not an exact match to the spectral curves defined by the CIE 1931 color space.

In order to account for this spectral mismatch, the prior art calorimeters must be calibrated to measure the color more accurately. In general, both the magnitude and the shape of the spectral response curves do not match the CIE 1931 tristimulus values. The most common means of performing a calorimeter calibration has been to use a single point color calibration technique. During the calibration procedure, the calorimeter first measures uncorrected tristimulus values ($X_{uncorrected}$, $Y_{uncorrected}$, $Z_{uncorrected}$) for the spectrum of the standard light source, $S_{Illuminant\,A}(\lambda)$ Illuminant A defined by CIE is the most commonly used light source spectrum for calibration of calorimeter. Since the spectrum of the standard light source $S_{Illuminant\,A}(\lambda)$ is known, the chromaticity coordinates of the standard light source can be calculated. The chromaticity coordinates are designated as ($x_{IlluminantA}$, $y_{IlluminantA}$). Given these values, the calibration coefficients of the calorimeter (k1, k2, k3) can be calculated by the following equations.

$$x_{corrected} = \frac{k1^* X_{uncorrected}}{k1^* X_{uncorrected} + k2^* Y_{uncorrected} + k3^* Z_{uncorrected}}$$

$$y_{corrected} = \frac{k2^* Y_{uncorrected}}{k1^* X_{uncorrected} + k2^* Y_{uncorrected} + k3^* Z_{uncorrected}}$$

$$k1^* X_{uncorrected} + k2^* Y_{uncorrected} + k3^* Z_{uncorrected} = 1$$

where $$X_{corrected} = k1^* X_{uncorrected} = k1 \int_{380 nm}^{780 nm} S_{illuminant\,A}(\lambda) \cdot x_{colorimeter}(\lambda)d\lambda$$

$$Y_{corrected} = k2^* Y_{uncorrected} = k2 \int_{380 nm}^{780 nm} S_{illuminant\,A}(\lambda) \cdot y_{colorimeter}(\lambda)d\lambda$$

$$Z_{corrected} = k3^* Z_{uncorrected} = k3 \int_{380 nm}^{780 nm} S_{illuminant\,A}(\lambda) \cdot z_{colorimeter}(\lambda)d\lambda$$

By storing the values k1, k2 and k3 and using them to calculate $X_{corrected}$, $Y_{corrected}$ and $Z_{corrected}$, the colorimeter is able to make accurate measurement of the chromaticity coordinates for calibration light source.

In FIG. 1, the measurements made with a spectroradiometer or a colorimeter extend over only a small area of the display device under test. Therefore, the traditional measurement comprises an average color or luminance measurement taken over a small portion of the light emitting area of the device under test. When a color measurement is performed on a display at multiple test locations, one has to reposition the prior art colorimeter or spectroradiometer from one point to another to measure the color of light at each test location.

BRIEF SUMMARY OF THE INVENTION

The present invention provides an improved color calibration method to measure color of light from multiple locations at one time. An imaging calorimeter comprising multiple individual detectors able to capture multiple light emitting areas is employed in this calibration method. Therefore, one can acquire much more data without moving the color measurement instrument (the imaging calorimeter).

In the color calibration method of the present invention, a flat-field calibration of the color measurement device is performed prior to color calibration.

For color measurements, multiple instances of irradiance of the array of detectors are performed for a single measurement. Optical elements in the imaging calorimeter modify the spectral power distribution of incoming light for each instance of irradiation of the detector array. The detector array response is flat-fielded for each instance of irradiation within a single color measurement. Color calibration coefficients are obtained for each instance of irradiation by selecting a subset of pixels from the different instances of irradiation, applying a flat-field correction matrix to the matrix of the pixel values, obtaining the total signal within the subset of pixels, and then calculating the appropriate color calibration coefficients based on the known spectrum or chromaticity coordinates of the light from the device under test.

BRIEF DESCRIPTION OF THE DRAWINGS

These, as well as other features of the present invention, will become more apparent upon reference to the drawings wherein.

DETAILED DESCRIPTION OF THE INVENTION

Figure 4:
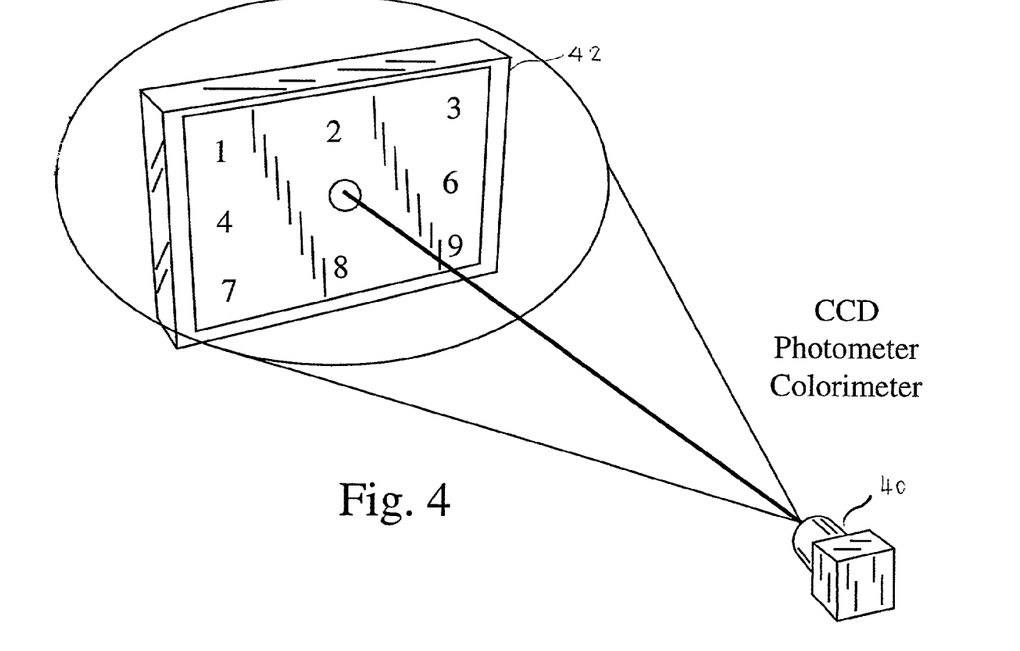
FIG. 4 shows an example of an imaging light and color measurement system provided in the invention.

As disclosed above, measurements made with a spectroradiometer or calorimeter as shown in FIG. 1 are taken over only a small area of the display device under test. Therefore, the traditional measurement comprises an average color or luminance measurement taken over an area at one location on the display surface. To reduce the measurement time and to analyze the color characteristics of the source of light, an imaging calorimeter is provided as the imaging light and color measurement instrument. The imaging calorimeter comprises a plurality, preferably thousands or millions of individual detectors. In one embodiment, a charge-coupled device (CCD) is cited as an example of the detector contained within the imaging calorimeter. FIG. 4 shows an imaging light and color measurement device 40 able to collect data for many points within the field of view thereof. As shown in FIG. 4, the light source 42 includes a plurality of light emitting areas designated as numeral references 1–9. All of the light emitting areas 1–9 are within the field of view (the solid circle in FIG. 4) of the imaging light and color measurement device 40. That is, the imaging light and color measurement device 40 is able to measure all the light-emitting areas 1–9 at once. The primary advantage the imaging color measurement system is the speed with which thousands or millions of data points are acquired. Thereby a complete analysis of the color characteristics of the source of light is achieved so that relative and absolute color differences can be efficiently measured.

Figure 5:
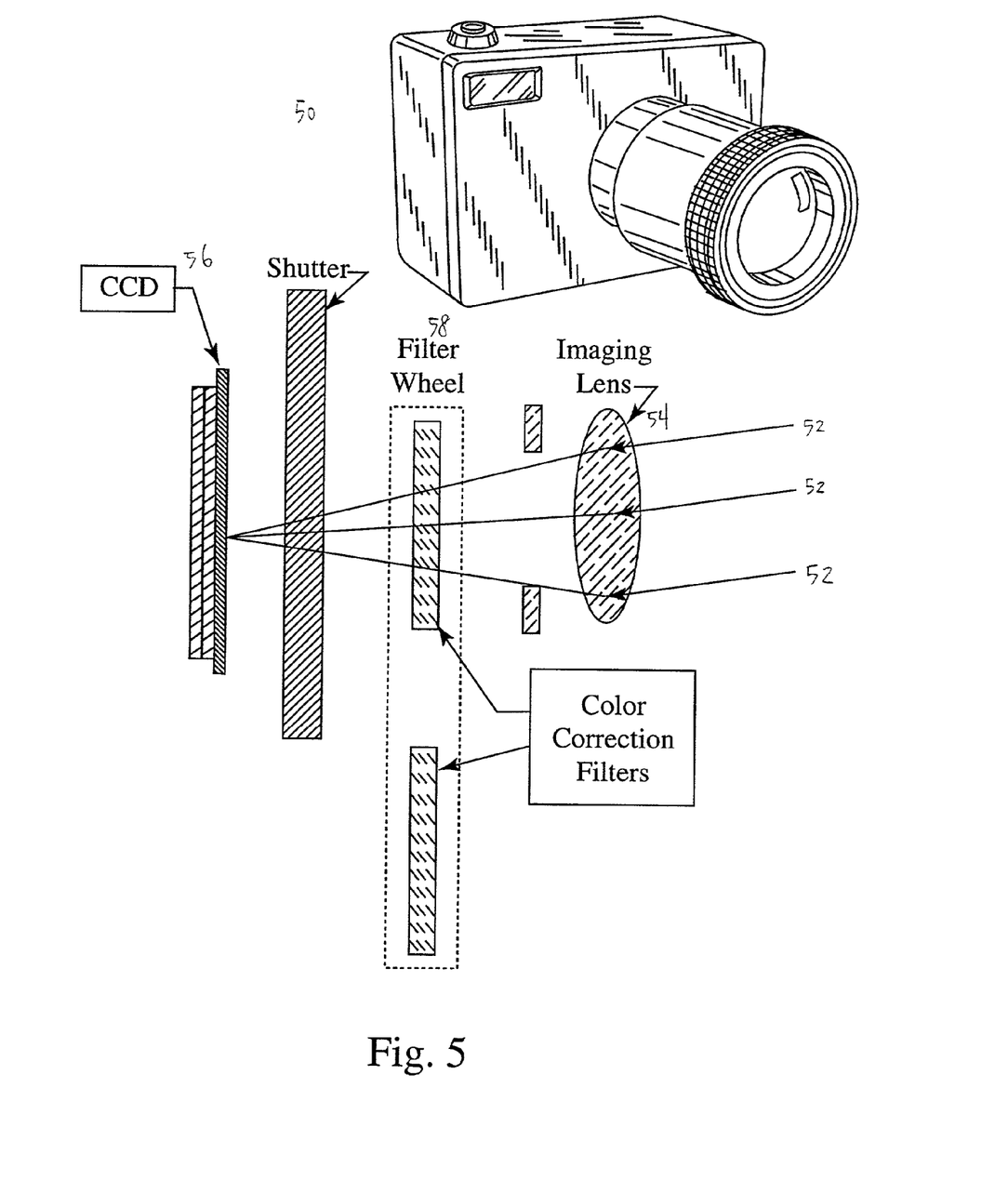
FIG. 5 shows a typical imaging light and color measurement system camera.

The imaging calorimeter comprises a lens which images light onto an array of detectors (pixels), optical elements designed to modify the spectral power distribution of the light incident on the array of detectors (optionally designed to allow the spectral response of the system to match a specific color space), and software for camera control, calibration and data analysis. To measure color, the imaging calorimeter will have one or more instances of irradiation of the array of detectors within a single color measurement. Each instance of irradiation comprises taking an image with the imaging calorimeter with the optical elements set to modify the spectral power distribution of incoming light in a different manner. Specific embodiments of the optical elements used to modify the spectral power distribution of light incident on the array of detectors include using a plurality of color filters, using a single tunable color filter, using a plurality of tunable color filters, using an interferometer, using an interference grating, using a plurality of arrays of detectors for different spectra of incident light, using a spectrally tunable mirror or micromirror device, using a dispersive element such as a prism or holographic grating, using a spectrograph, or using a liquid crystal on silicon (LCOS) reflective element that controls the color of light reflected in a particular direction. In the preferred embodiment of the imaging calorimeter, a plurality of color filters are used as the optical elements designed to modify the spectral power distribution of the light incident on the array of detectors and a CCD is used as the array of detectors. A view of the imaging light and color measurement system is shown in FIG. 5. As shown in FIG. 5, in the CCD camera 50, light beams 52 from the image to be captured are focused onto the CCD 56 by an imaging lens 54. According to specific requirements, a filter wheel 58 that comprises various filters are disposed between the imaging lens 54 and the CCD 56.

Figure 6:
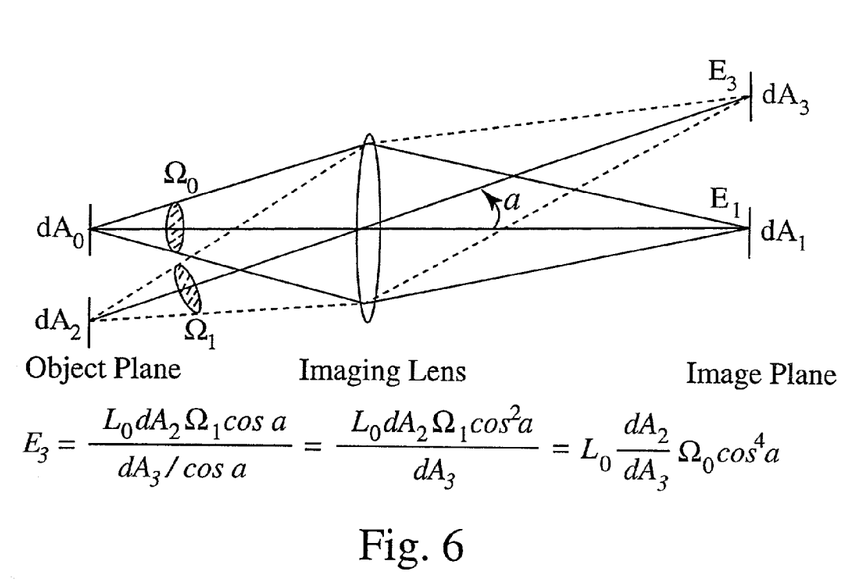
FIG. 6 shows a non-uniform irradiance formed on a charge coupled device (image plane) by an imaging system and uniform luminance light source (object plane)

For all of the embodiments of the imaging calorimeter mentioned above, it is known that the irradiance on the image plane such as the CCD 56 in FIG. 5 is not linearly related to the luminance in the object plane (the image to be captured). As shown in FIG. 6, for a perfect imaging system, the irradiance in the image plane falls off as cosine function of the field angle of the system.

In addition, for a real imaging system, factors such as lens vignetting can further affect the irradiance distribution in the image plane. This necessitates the CCD camera to be flat-fielded to accurately measure the luminance, radiance or other spectrally weighted radiance quantities in the object plane.

To accurately measure the luminance, radiance or other spectrally weighted radiance quantities in the object plane, the CCD camera must be "flat-fielded" for each instance of irradiation of the array of detectors within a single color measurement. In the flat-fielding process, the CCD is aimed at a uniform radiance light source, of which the actual or relative radiance values are known as a matrix L. The acquired image is in a form of a voltage value on each CCD pixel. The voltage value is proportional to the irradiation incident on each CCD pixel. The acquired image of the light source can thus be represented by a matrix M with a matrix of voltage values, i.e., the irradiance response. For example, when the CCD comprises a 512×512 matrix of pixels, the resultant image is then measured with a 512×512 matrix of voltage values. The degree that the measured irradiance at each pixel [i,j] deviates from the actual or relative radiance measured is represented by a correction coefficient K[i,j]. The coefficient for the whole matrix of pixels can thus be obtained by the relationship of M*K=L, which means that [i,j] the matrix element of L is equal to the [i,j] matrix element of M multiplied by the [i,j] matrix element of K. This should not be confused as standard matrix multiplication.

Figure 7:
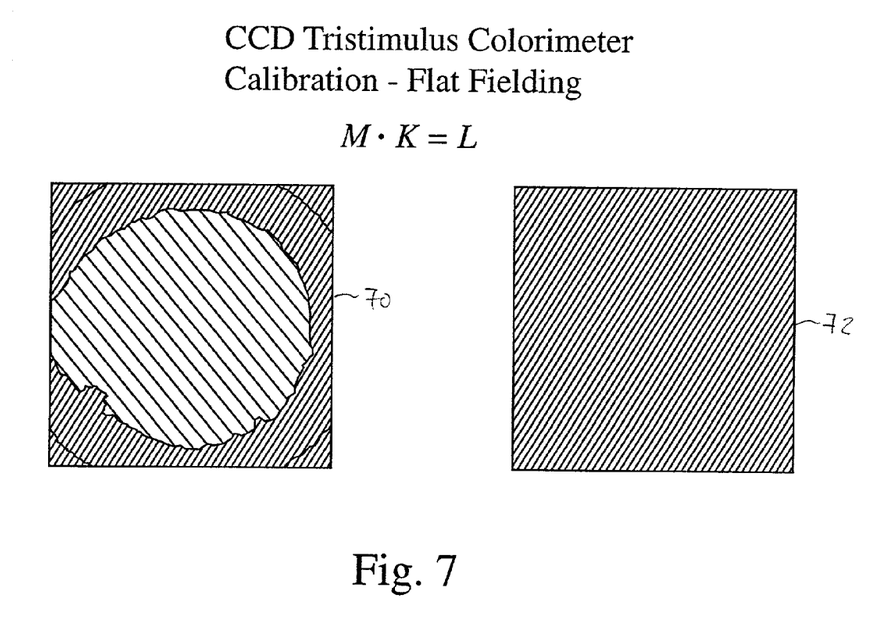
FIG. 7 shows two CCD images, one with and one without applying a flat-field correction matrix.

FIG. 6 shows a flat-field correction method for a camera with a detector array. In FIG. 7, the icon 70 illustrates the image of a light source with uniform luminance captured by a charge coupled device (CCD) without applying the correction matrix. The icon 72 shows the image of a light source with uniform luminance captured by a charge coupled device with the correction matrix applied.

Figure 8:
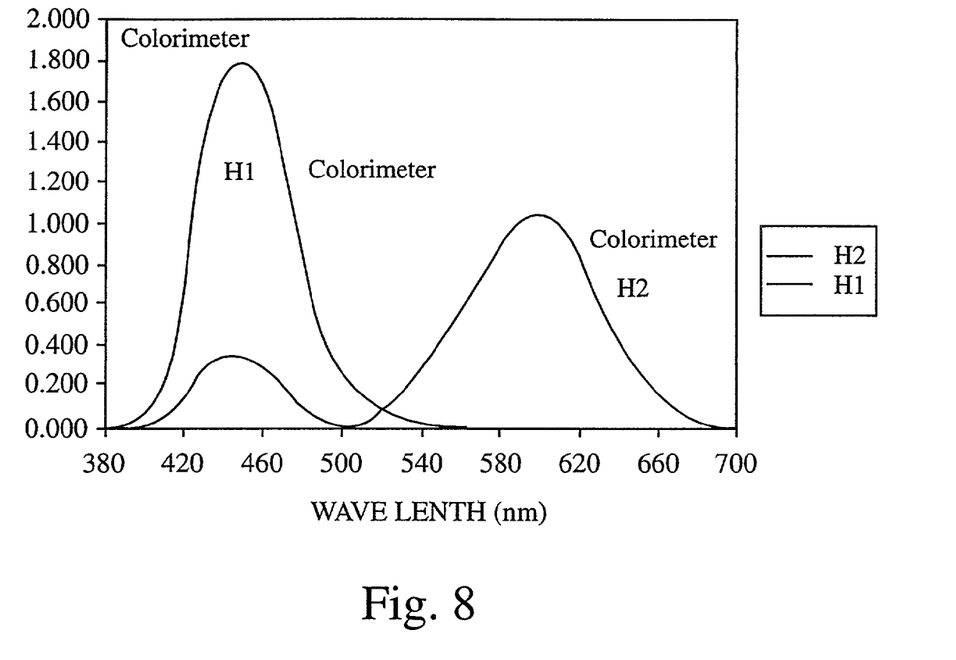
FIG. 8 shows the x 1931 CIE chromaticity function and filter response for each hump of the function.

The above flat fielding process is performed before the color calibration is performed. In the color calibration, each instance of irradiation of the CCD within a single color measurement must be flat-fielded. In the preferred embodiment, various filters are used in front of the as the optical elements designed to modify the spectral power distribution of the light incident on the CCD. In the preferred embodiment, four filters are used to allow the spectral response of the system to match the specific color space of the CIE (Commission Internationale de l'Eclairage) 1931 (x,y) chromaticity coordinates. The filters are used for the X1, X2, −Y and Z measurements respectively, whereas X1 is calculated using the hump of the x(λ) curve, designated by the curve H1 in FIG. 8, and X2 is calculated using the red hump of the x(λ) curve, designated by the curve H2 in FIG. 8. The two filters X1 and X2 are used together to additively obtain the measurement for X. For this embodiment, each instance of irradiation of the CCD through the different filters can be referred to as a different color image. The above flat-fielding process for each of the four color images allows calculation of the four corresponding error correction matrices. That is, for each filter, the flat-fielding calibration is performed to obtain the error correction matrices $K_{X1}$, $K_{X2}$, $K_Y$ and $K_Z$. The relationship between the 3 actual irradiance (and therefore actual measured voltage response of the CCD pixels) $M_{X1}$, $M_{X2}$, $M_Y$ and $M_Z$ and the flat-fielded corrected spectrally weighted irradiance (power per unit area) $E_{X1}$, $E_{X2}$, $E_Y$ and $E_Z$ incident on the array of CCD pixels for each of the four filters can be represented as:

$$E_{X1\ flat\text{-}fielded} = K_{x1} * M_{X1},$$

$$E_{X2\ flat\text{-}fielded} = K_{x2} * M_{X2},$$

$$E_{Y\ flat\text{-}fielded} = K_Y * M_Y,$$

$$E_{Z\ flat\text{-}fielded} = K_Z * M_Z,$$

where $K_{x1}$, $K_{x2}$, $K_Y$, and $K_z$ are the error correction matrices required for color calibration which can be obtained using the procedure as disclosed above.

In order to calculate the tristimulus values for each pixel of the CCD, appropriate scaling factors have to be determined by a calibration process for each of the tristimulus values. The matrices of tristimulus measurements for the CCD array measurements may be written as:

$$X1_{corrected} = C_{x1} * E_{X1\ flat\text{-}fielded},$$

$$X2_{corrected} = C_{x2} * E_{X2\ flat\text{-}fielded},$$

$$Y_{corrected} = C_Y * E_{Y\ flat\text{-}fielded},$$

$$Z_{corrected} = C_Z * E_{Z\ flat\text{-}fielded},$$

where $C_{X1}$, $C_{x2}$, $C_Y$, $C_z$ are constants, called color correction coefficients, to be determined by the calibration process.

To determine the color correction coefficients, a standard illuminant light source with a known spectral content $S(\lambda)$ and therefor known chromaticity coordinates (x,y) is measured. Four images are obtained by measuring the standard illuminant light source using the imaging colorimeter incorporating four filters. The same portion of each of the four images is selected as the color calibration area for each image, which amounts to some subset of the pixels in the matrices $E_{X1}$, $E_{X2}$, $E_Y$, $E_Z$. This subset of the images is chosen to correspond to that portion of the images containing the light of known spectral content, and therefore the known chromaticity coordinates. The spectral characteristic of the calibration light source may be known by virtue of the fact that it is a calibrated standard illuminant, a special calibrated light source, or by measurement with a spectroradiometer. When a spectroradoimeter is used to measure the light source, it has to be ensured that the light measured by the spectroradiometer is identical to the light captured in the subset of the image matrices. If the subset of the image matrices is selected as $E_{X1}$, $E_{X2}$, $E_Y$, $E_Z$ and the subset of CCD pixels contains the same pixels for each image, and if the total (or the average) optical power per unit area (spectrally weighted irradiance) on each subset of pixels is designated as the scalar quantities $E_{X1}$, $E_{X2}$, $E_Y$, $E_Z$, the color correction coefficients $C_{X1}$, $C_{x2}$, $C_Y$, $C_z$ can be derived from the following four equations.

$$x_{CalibrationStandard} = \frac{C_{X1} * \bar{E}_{X1flat-fielded} + C_{X2} * \bar{E}_{X2flat-fielded}}{C_{X1} * \bar{E}_{flat-fielded} + C_{X2} * \bar{E}_{X2flat-fielded} + C_Y * \bar{E}_{Yflat-fielded} + C_Z * \bar{E}_{Zflat-fielded}}$$

$$y_{CalibrationStandard} = \frac{C_Y * \bar{E}_{Yflat-fielded}}{C_{X1} * \bar{E}_{X1flat-fielded} + C_{X2} * \bar{E}_{X2flat-fielded} + C_Y * \bar{E}_{Yflat-fielded} + C_Z * \bar{E}_{Zflat-fielded}}$$

$$C_{X1} * \bar{E}_{X1flat-fielded} + C_{X2} * \bar{E}_{X2flat-fielded} + C_Y * \bar{E}_{Yflat-fielded} + C_Z * \bar{E}_{Zflat-fielded} = 1$$

$$\frac{C_{X1} * \bar{E}_{X1flat-fielded}}{C_{X2} * \bar{E}_{X2flat-fielded}} = \text{known constant}$$

In the above equation, the known constant is a known value based on the CIE definition or spectroradiometer measurements of the calibration standard light source. Given the known parameters of $$x_{Calibration\ Standard},\ y_{Calibration\ Standard},\ \frac{C_{X1} * \bar{E}_{X1flat-fielded}}{C_{X2} * \bar{E}_{X2flat-fielded}}$$

and the average measured spectrally weighted irradiance of $E_{X1flat-fielded}$, $E_{X2flat-fielded}$, $E_{Yflat-fielded}$, $E_{Zflat-fielded}$, the color correction coefficients $C_{X1}$, $C_{X2}$, $C_Y$, $C_Z$ can be calculated from the above four equations.

Having calculated the correction coefficients $C_{X1}$, $C_{X2}$, $C_Y$, $C_Z$ in the calibration process using the above method, all subsequent color measurements are calculated using the correction coefficients. In other words, for the calibration of the imaging calorimeter, the color coordinates x and y are known values, and $C_{X1}$, $C_{X2}$, $C_Y$, $C_Z$ are calculated based on data measured with the color measurement device as described above; however, after calibration, when using the system to take new color measurements, $C_{X1}$, $C_{X2}$, $C_Y$, $C_Z$ are known values and the color coordinates x and y are calculated based on data measured with the color measurement device as described above.

According to the above, the color calibration method provided by the invention has the advantage of allowing accurate evaluation of light prior to calculating the color correction coefficients. From empirical data, it has been shown that the method of color calibration yields chromaticity coordinate accuracy of the measurements with the illuminant A of about ±0.001. With the new calibration technique utilizing the flat-fielding calibration, an accuracy of about ±0.0003 for both the x and y chromaticity coordinates of illuminant A is obtained.

Indeed, each of the features and embodiments described herein can be used by itself, or in combination with one or more of other features and embodiment. Thus, the invention is not limited by the illustrated embodiment but is to be defined by the following claims when read in the broadest reasonable manner to preserve the validity of the claims.

What is claimed is:

1. A color calibration method for an imaging color measurement device, comprising:
   selecting an array of detectors of optical radiation;
   selecting a plurality of optical elements designed to modify spectral power distribution of light incident on the array of detectors, such that a plurality of instances of irradiance of the array of detectors in a single measurement is resulted;
   obtaining an error correction matrix for the imaging color measurement device for each instance of irradiance of the array of detectors in a single color measurement;
   measuring a light source with known spectral output or chromaticity coordinates to obtain an irradiance response matrix of the imaging color measurement device for each of instance of irradiation of the array of the detectors in a single color measurement;
   applying the error correction matrix to the irradiance response matrix obtained by measuring the light source, so as to obtain a corrected irradiance response matrix for each instance of irradiation of the array of detectors in a single color measurement; and
   calculating a color correction coefficient according to the known spectral output or chromaticity coordinate of the light source and the corrected response for each instance of irradiation of the array of detectors in a single color measurement.

2. The color calibration method according to claim 1, wherein the step of obtaining an error correction matrix of the imaging color measurement device for each instance of irradiation of the array of detectors in a single color measurement further comprises calculation of a flat-fielding correction matrix by:
   aiming the imaging color measurement device at a light source with a known radiance value matrix L to acquire an image for each instance of irradiation of the array of detectors in a single color measurement, wherein a response M for each image is obtained;
   calculating the flat-fielding correction matrix K according to the equation of M*K=L, wherein each element of L is equal to each corresponding element of M multiplied by each corresponding element of L; wherein
   each element of the flat-fielding correction matrix K represent an error correction factor of a corresponding light point of the illuminant light source.

3. The color calibration method according to claim 1, wherein the step of selecting a plurality of optical elements designed to modify the spectral power distribution of light incident on the array of detectors includes selecting a set of optical filters designated to be used in conjunction with spectral response of a detector and imaging optics of the color calibration method to define a color space.

4. The color calibration method according to claim 1, wherein the step of selecting a plurality of optical elements designed to modify the spectral power distribution of light incident on the array of detectors includes selecting four filters, designated to be used in conjunction with the spectral response of the detector and imaging optics to match the tristimulus values X1, X2, Y and Z.

5. The color calibration method according to claim 4, wherein color correction coefficients $C_{X1}$, $C_{X2}$, $C_Y$, $C_Z$ for each of the filters X1, X2, Y and Z are calculated according to the equations of:

$$x_{CalibrationStandard} = \frac{C_{X1} * \overline{E}_{X1flat-fielded} + C_{X2} * \overline{E}_{X2flat-fielded}}{C_{X1} * \overline{E}_{flat-fielded} + C_{X2} * \overline{E}_{X2flat-fielded} + C_Y * \overline{E}_{Yflat-fielded} + C_Z * \overline{E}_{Zflat-fielded}}$$

$$y_{CalibrationStandard} = \frac{C_Y * \overline{E}_{Yflat-fielded}}{C_{X1} * \overline{E}_{X1flat-fielded} + C_{X2} * \overline{E}_{X2flat-fielded} + C_Y * \overline{E}_{Yflat-fielded} + C_Z * \overline{E}_{Zflat-fielded}}$$

$$C_{X1} * \overline{E}_{X1flat-fielded} + C_{X2} * \overline{E}_{X2flat-fielded} + C_Y * \overline{E}_{Yflat-fielded} + C_Z * \overline{E}_{Zflat-fielded} = 1$$

$$\frac{C_{X1} * \overline{E}_{X1flat-fielded}}{C_{X2} * \overline{E}_{X2flat-fielded}} = \text{known constant,}$$

wherein $x_{ColibriationStandard}$ and $y_{CalibrationStandard}$ are the known chromaticity coordinates of the illuminate light source and $\overline{E}_{X1flat-fielded}$, $\overline{E}_{X2flat-fielded}$, $\overline{E}_{Yflat-fielded}$, $\overline{E}_{Zflat-fielded}$ are total or average spectrally weighted irradiance on a subset of pixels of the array of detectors.

6. The color calibration method according to claim 1, wherein the step of selecting an array of detectors of optical radiation further comprising the step of selecting a charge coupled device.

7. The color calibration method according to claim 1, wherein the step of selecting an array of detectors of optical radiation further comprises the step of selecting a CMOS device.

8. The color calibration method according to claim 4, further comprising a step of obtaining tristimulus values X1, X2, Y and Z for the imaging color measurement device by multiplying the total or average spectrally weighted irradiance on a subset of pixels of the array of detectors $E_{X1flat-fielded}$, $E_{X2flat-fielded}$, $E_{Yflat-fielded}$, $E_{Zflat-fielded}$ for each of the color filters with the corresponding color correction coefficient $C_{X1}$, $C_{X2}$, $C_Y$ and $C_Z$, respectively.

9. The color calibration method according to claim 1, wherein the imaging color measurement device includes an array of pixels, such that:
the error correction matrix for each instance of irradiation of the array of detectors in a single color measurement is in a form of a flat-fielding correction matrix;
the irradiance response for each of the color filters is in a form of a irradiance response matrix; and
the flat-fielded spectrally weighted irradiance response for each of the color filters is in a form of a flat-fielded spectrally weighted irradiance response matrix.

10. A color calibration method, comprising:
providing an imaging color measurement device able to measure a plurality of light emitting spots at once;
flat fielding the imaging color measurement device;
color calibrating the imaging color measurement device, further comprising the following steps:
measuring an illuminant light source with known spectral response or chromaticity coordinates to obtain a flat-fielded irradiance response and an average flat-fielded irradiance response;
calculating one or more color correction coefficients for the imaging color measurement device according to the known chromaticity coordinates of the illuminant light source, the flat-fielded irradiance response, and the average flat-fielded irradiance response; and
obtaining trismulus values of the imaging color measurement device by multiplying the flat-fielded irradiance response with the color correction coefficient.

11. The color calibration method according to claim 10, wherein the flat-fielding step is performed prior to the step of calculating a color correction coefficient of the imaging color measurement.

12. The color calibration method according to claim 10, further comprising using a plurality of color filters to measure the illuminant light source.

13. The color calibration method according to claim 12, wherein the imaging color measurement device is flat fielded for each of the color filters.

14. The color calibration method according to claim 12, wherein the step of obtaining the color correction coefficient includes calculating the color correction coefficient for each of the color filters.

* * * * *

UNITED STATES PATENT AND TRADEMARK OFFICE
CERTIFICATE OF CORRECTION

PATENT NO. : 7,012,633 B2 Page 1 of 1
APPLICATION NO. : 10/092417
DATED : March 14, 2006
INVENTOR(S) : David R. Jenkins It is certified that error appears in the above-identified patent and that said Letters Patent is hereby corrected as shown below:

Title page, item [73] should read as follows:
Assignee: Radiant Imaging, Inc.

Signed and Sealed this

Sixteenth Day of September, 2008

JON W. DUDAS
*Director of the United States Patent and Trademark Office*